United States Patent
Kubisiak et al.

(10) Patent No.: US 12,351,335 B2
(45) Date of Patent: Jul. 8, 2025

(54) SECURITY KEY FOR UNMANNED AERIAL VEHICLE

(71) Applicant: Skydio, Inc., Redwood City, CA (US)

(72) Inventors: Brian Kubisiak, San Mateo, CA (US); Joseph Anthony Enke, San Carlos, CA (US); Ryan Hornung, Redwood City, CA (US); Stepan Moskovchenko, Belmont, CA (US)

(73) Assignee: Skydio, Inc., San Mateo, CA (US)

( * ) Notice: Subject to any disclaimer, the term of this patent is extended or adjusted under 35 U.S.C. 154(b) by 521 days.

(21) Appl. No.: 17/540,183

(22) Filed: Dec. 1, 2021

(65) Prior Publication Data

US 2022/0315240 A1  Oct. 6, 2022

Related U.S. Application Data

(60) Provisional application No. 63/170,883, filed on Apr. 5, 2021.

(51) Int. Cl.
*B64D 45/00* (2006.01)
*B64U 70/40* (2023.01)
(Continued)

(52) U.S. Cl.
CPC ......... *B64D 45/0018* (2019.08); *B64U 70/40* (2023.01); *G06F 13/4282* (2013.01);
(Continued)

(58) Field of Classification Search
CPC .............. B64D 45/0018; B64C 39/024; G06F 13/4282; G06F 2213/0042; H04L 9/30; H04L 63/0435; B64U 2201/20
See application file for complete search history.

(56) References Cited

U.S. PATENT DOCUMENTS 9,778,653 B1 * 10/2017 McClintock ........... G06Q 10/08
10,673,617 B1 * 6/2020 Antoniou ............ G06F 13/4282
(Continued)

FOREIGN PATENT DOCUMENTS

WO    WO-2019109727 A1 *  6/2019 ............. G06F 21/44

OTHER PUBLICATIONS

Zhao, Identity Verification Method and Apparatus, WO_2019109727_A1_I_machine_translation (Year: 2019).*
(Continued)

*Primary Examiner* — Anne Marie Antonucci
*Assistant Examiner* — Patrick M Brady
(74) *Attorney, Agent, or Firm* — Young Basile Hanlon & MacFarlane, P.C.

(57) ABSTRACT

Described herein are systems and methods using a security key for an unmanned aerial vehicle. For example, some methods include during flight of an unmanned aerial vehicle, encrypting, using a public key stored by the unmanned aerial vehicle, a symmetric key that is used to encrypt media data captured using one or more sensors of the unmanned aerial vehicle to obtain encrypted media data; landing the unmanned aerial vehicle; connecting a key device to the unmanned aerial vehicle via a serial port connector of the key device and a serial port connector of the unmanned aerial vehicle; while the key device is connected to the unmanned aerial vehicle, decrypting, using a private key stored on the key device, the encrypted symmetric key, which in turn is used to decrypt a portion of the encrypted media data to obtain decrypted media data; and transmitting a portion of the decrypted media data.

20 Claims, 11 Drawing Sheets

(51) Int. Cl.
*G06F 13/42* (2006.01)
*H04L 9/30* (2006.01)
*H04L 9/40* (2022.01)
*B64U 10/14* (2023.01)
*B64U 20/87* (2023.01)
*B64U 30/293* (2023.01)
*B64U 50/37* (2023.01)
*B64U 80/20* (2023.01)
*B64U 80/25* (2023.01)
*B64U 101/30* (2023.01)

(52) U.S. Cl.
CPC ............ *H04L 9/30* (2013.01); *H04L 63/0435* (2013.01); *B64U 10/14* (2023.01); *B64U 20/87* (2023.01); *B64U 30/293* (2023.01); *B64U 50/37* (2023.01); *B64U 80/20* (2023.01); *B64U 80/25* (2023.01); *B64U 2101/30* (2023.01); *B64U 2201/20* (2023.01); *G06F 2213/0042* (2013.01)

(56) References Cited

U.S. PATENT DOCUMENTS

| | | | |
|---|---|---|---|
| 2006/0093150 A1* | 5/2006 | Reddy | H04L 9/0825 380/282 |
| 2006/0269066 A1* | 11/2006 | Whitehead | H04L 63/0428 380/270 |
| 2017/0048214 A1* | 2/2017 | Winslow | H04L 9/0891 |
| 2017/0083713 A1* | 3/2017 | Simmons | H04L 9/0897 |
| 2019/0227557 A1 | 7/2019 | Kim et al. | |
| 2019/0281259 A1* | 9/2019 | Palazzolo | H04N 7/183 |

OTHER PUBLICATIONS

International Search Report and Written Opinion mailed on Jul. 26, 2022 in corresponding PCT Application No. PCT/US22/22465.
Extended European Search Report mailed on Jan. 8, 2025 in corresponding European Patent Application No. 22785166.4.

* cited by examiner

SECURITY KEY FOR UNMANNED AERIAL VEHICLE

CROSS REFERENCE TO RELATED APPLICATIONS

This application claims the benefit of U.S. Provisional Application No. 63/170,883, filed Apr. 5, 2021, the contents of which are incorporated by reference herein in their entirety.

TECHNICAL FIELD

This disclosure relates to a security key for an unmanned aerial vehicle.

BACKGROUND

Unmanned aerial vehicles (e.g., a drone) can be used to capture images from vantage points that would otherwise be difficult to reach. The drones typically are operated by a human using a specialized controller to remotely control the movements and image capture functions of the unmanned aerial vehicle. Some automated image capture modes have been implemented, such as recording video while following a recognized user or a user carrying a beacon device as the user moves through and environment.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
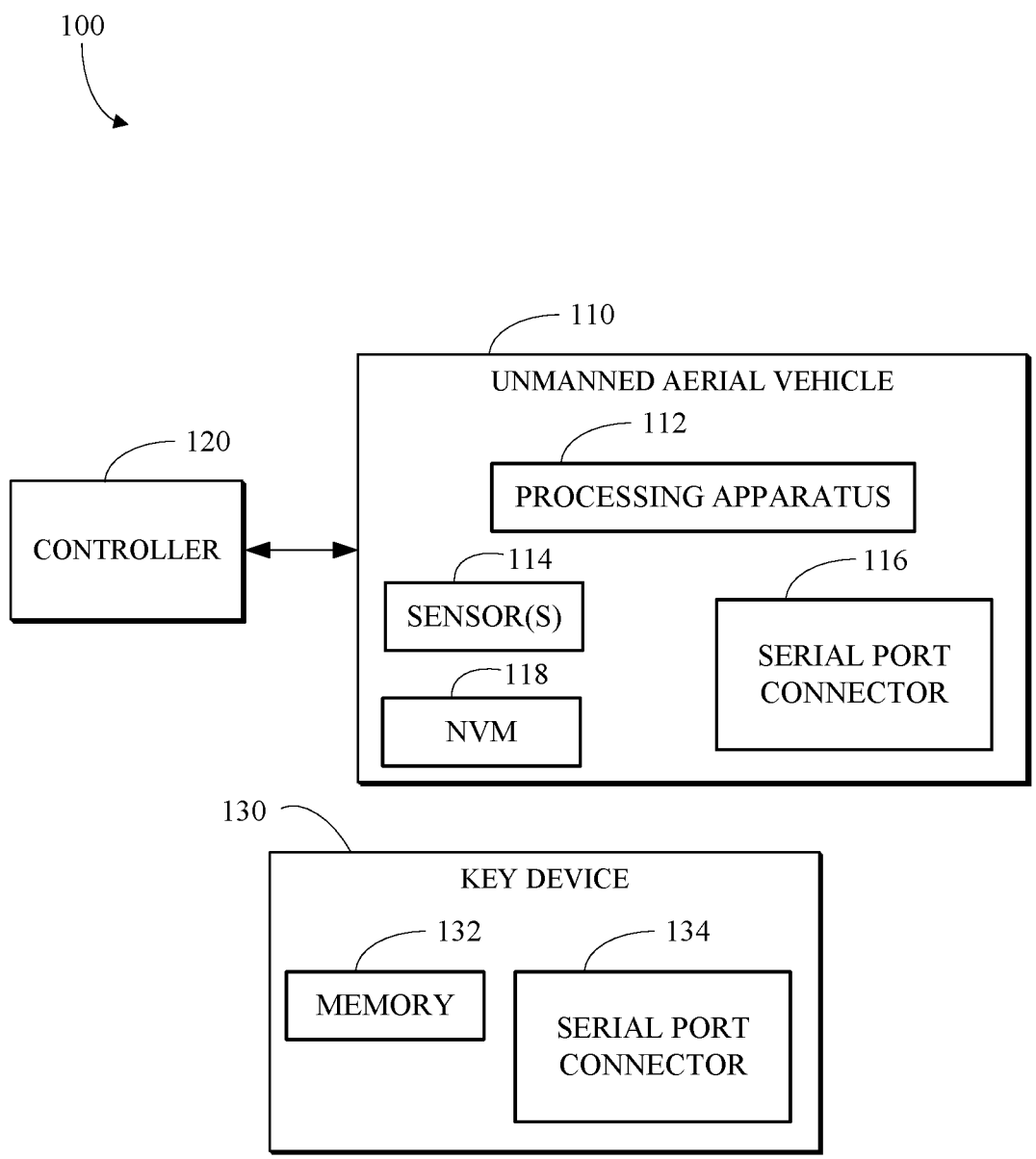
FIG. 1 is an illustration of an example of a system for securely storing and accessing media data on an unmanned aerial vehicle using a security key.

Data stored on an unmanned aerial vehicle (e.g., video) can be valuable or sensitive. An unmanned aerial vehicle (e.g., a quad-copter drone) can be subject to loss for various reasons, which may put the data stored therein at risk for tampering. Disclosed herein are techniques for encrypting media data on an unmanned aerial vehicle using a security key device. A key device includes a serial port connector and memory storing a private key that can be used to access encrypted media data captured by the unmanned aerial vehicle. The private key is paired with a public key, which the unmanned aerial vehicle stores and uses to encrypt a symmetric key that is used to encrypt media data it captures. The encrypted symmetric key may be stored with the encrypted media data and later decrypted using the private key of the security key device to enable decryption of the encrypted media data. The unmanned aerial vehicle may avoid storing the private key while flying in order to avoid the possibility of compromising the private key if the unmanned aerial vehicle is lost or otherwise compromised.

A user wishing to access encrypted data stored on the unmanned aerial may connect the key device to the unmanned aerial vehicle by inserting its male serial port connector (e.g., a universal serial bus (USB) plug) into a matched female serial port connector (e.g., a USB receptacle) of the unmanned aerial vehicle. The unmanned aerial vehicle may be configured to use the private key stored on the key device to decrypt the encrypted symmetric key, use the recovered symmetric key to decrypt encrypted media data stored in memory of the unmanned aerial vehicle, and present the decrypted media data to the user (e.g., via transmission to a controller or other user device that can be used to the view and/or listen to the media data). For example, the memory of the key device storing the private key may be part of a secure element in the security key device. For example, the memory of the key device may include a flash drive that is memory mapped by a processor of the unmanned aerial vehicle while the key device is connected to the unmanned aerial vehicle. This decryption process may be performed, in part or in whole, while the key device is connected to the unmanned aerial vehicle. For example, the key device may include a light emitting diode that is configured to blink while a decryption operation is being performed by the unmanned aerial vehicle and stop blinking when the decryption operation is complete to indicate to a user that the key device may be removed from the unmanned aerial vehicle.

In some implementations, the unmanned aerial vehicle stores a copy of the symmetric key in volatile memory and continues decrypting media data as needed after the key device is removed until the unmanned aerial vehicle powers down or a takeoff is performed by the unmanned aerial vehicle. For example, the symmetric key may be deleted from memory of the unmanned aerial vehicle when the unmanned aerial vehicle prepares to takeoff, to ensure that the unmanned aerial vehicle does not store a copy of the symmetric key that was used to encrypt data from a previous flight when it is in flight and most at risk for loss. In some implementations, the symmetric key used for encrypting new media data may be changed for each flight or periodically during a flight and the plaintext version of a symmetric key may be deleted from memory of the unmanned aerial vehicle after it has been encrypted for storage with the encrypted data and the unmanned aerial vehicle is finished using it for encryption of media data. In some implementations, a compromise of the unmanned aerial vehicle during flight only allows the compromise of the most recently captured media data that has been encrypted with a current symmetric key being used for encryption.

For example, the public key may also be stored on the key device and transferred from the key device to the unmanned aerial vehicle prior to encryption of media data. The key device may be connected to the unmanned aerial vehicle via the serial port connector (e.g., for a first time) to perform an encryption provisioning operation that transfers the public key from the key device to the unmanned aerial vehicle. In some implementations, a light emitting diode on the key device is configured to blink while an encryption provisioning operation is being performed and stop blinking when the encryption provisioning operation is complete to indicate to a user that the key device may be removed from the unmanned aerial vehicle.

In an example of a usage scenario, a user may insert a key device into an unmanned aerial vehicle while it is powered on to review encrypted media data stored on the unmanned aerial vehicle. Connecting the key device may trigger a decryption operation and a light emitting diode on the key device may flash while the decryption operation is being performed. Once the light emitting diode on the key device has stopped flashing, the encrypted media becomes visible in a user interface (e.g., in an app) for the user to review. The user may use another computing device (e.g., a smartphone, a tablet, a laptop, or a specialized controller) to review and copy encrypted media in decrypted form from the unmanned aerial vehicle to the computing device. The key device may be inserted into the unmanned aerial vehicle (e.g., a drone) while it is powered on. This will decrypt the media data. The media data may persist in decrypted form until the user powers off the unmanned aerial vehicle or begins a new flight, after which a user would need to reinsert the key device to decrypt the stored media again.

Some implementations may provide advantages over earlier systems, such as, preventing the compromise of a private key for decryption of encrypted media data by storing it long-term only in a separate, removably connectable, key device.

Software running on a processing apparatus in an unmanned aerial vehicle and/or on a controller for the unmanned aerial vehicle may be used to implement the security key techniques described herein.

FIG. 1 is an illustration of an example of a system 100 for securely storing and accessing media data on an unmanned aerial vehicle 110 using a security key. The system 100 includes an unmanned aerial vehicle 110, a controller 120, and a key device 130. The controller 120 may communicate with the unmanned aerial vehicle 110 via a wireless communications link (e.g., via a WiFi network or a Bluetooth link) to receive video or images and to issue commands (e.g., takeoff, land, follow, manual controls, and/or commands related to conducting encryption and decryption of media data). For example, the controller 120 may be the controller 250 of FIG. 2C. In some implementations, the controller includes a smartphone, a tablet, or a laptop running software configured to communicate with and control the unmanned aerial vehicle 110. For example, the system 100 may be used to implement the process 500 of FIG. 5, the process 600 of FIG. 6, the process 700 of FIG. 7, and/or the process 800 of FIG. 8.

The unmanned aerial vehicle 110 includes a processing apparatus 112, one or more image sensors 114, a serial port connector 116, and a non-volatile memory 118. The unmanned aerial vehicle 110 may include a propulsion mechanism (e.g., including propellers and motors). For example, the unmanned aerial vehicle 110 may be the unmanned aerial vehicle 200 of FIGS. 2A-B. For example, the unmanned aerial vehicle 110 may include the hardware configuration 400 of FIG. 4.

The one or more image sensors 114 may be at various positions on the unmanned aerial vehicle 110 to capture images (e.g., frames of video or still images). The one or more image sensors 114 may be configured to capture images at various wavelengths of light (e.g., visible light, infrared, or near-infrared) and at various resolutions. For example, the one or more image sensors 114 may include the array of image sensors (220-226) of FIGS. 2A-B.

The serial port connector 116 (e.g., a female serial port connector) is configured to removably connect the unmanned aerial vehicle 110 to another device via a serial port link. For example, the serial port connector 116 may include a USB-C receptacle or a USB-A receptacle. The serial port connector 116 may implement a serial port protocol (e.g., USB, I2C or SPI) for communications with a connected device, such as the key device 130.

The key device 130 includes a memory 132 and a serial port connector 134 (e.g., a male serial port connector) configured to removably connect to the serial port connector 116 of the unmanned aerial vehicle 110. In some implementations, the serial port connector 134 and the serial port connector 116 are universal serial bus (USB) connectors. For example, the serial port connector 134 may include a USB-C plug or a USB-A plug. The serial port connector 134 may implement a serial port protocol (e.g., USB, I2C or SPI) for communications with a connected device, such as the unmanned aerial vehicle 110. The memory 132 stores data including a public key and a private key, paired with the public key, that may be used to decrypt media data on an unmanned aerial vehicle 110. For example, the public key may be copied to the unmanned aerial vehicle during an encryption provisioning operation performed while the key device 130 is connected to the unmanned aerial vehicle 110 via the serial port connector 116 and the serial port connector 134. This public key may then be used by the unmanned aerial vehicle 110 to encrypt a symmetric key that is used to encrypt media data captured during a flight of the unmanned aerial vehicle 110. For example, the key device 130 may then be connected to the unmanned aerial vehicle 110 after it lands to enable decryption of the symmetric key using the paired private key and subsequent decryption of some or all of the encrypted media data. For example, the key device 130 may be the key device 300 of FIG. 3.

In some implementations, the memory 132 of the key device 130 that is configured to store the private key is part of a secure element in the key device 130. For example, the secure element may be a cryptographic secure element and may include a processor or microcontroller in addition to the memory 132 that is configured to strictly control access to the private key. The secure element may be configured to process decryption requests using the private key to avoid the need for exposing the private key outside of the secure element. For example, the secure element may decrypt an encrypted symmetric key in response to a request from the unmanned aerial vehicle 110. The secure element may be configured to delete or otherwise destroy the private key in the event of tampering with the secure element.

In some implementations, the key device 130 includes a light emitting diode and the key device is configured to blink the light emitting diode while performing an encryption provisioning operation, including transmitting the public key to the processing apparatus via the serial port connector 134 connected to the serial port connector 116; and turn off the light emitting diode responsive to completion of the encryption provisioning operation. For example, the key device 130 may be configured to blink the light emitting diode while performing a decryption operation, including decrypting, using the private key, a portion of the encrypted media data to obtain the decrypted media data; and turn off the light emitting diode responsive to completion of the decryption operation.

The non-volatile memory 118 is configured to store data persistently through a loss of power in the unmanned aerial vehicle 110, such as when a battery becomes fully discharged. For example, the non-volatile memory 118 may include a solid-state drive, a read-only memory device (ROM), an optical disc, and/or a magnetic disc. For example, the non-volatile memory 118 may be used to store media data (e.g., video) captured by the unmanned aerial vehicle 110 and encrypted versions of symmetric keys that have been used to encrypt the media data.

The processing apparatus 112 (e.g., the processing apparatus 410) may be configured to: store a public key, wherein the public key is paired to the private key; encrypt, using the public key, a symmetric key used to encrypt media data captured using the one or more sensors 114 to obtain an encrypted symmetric key; store the encrypted media data in the non-volatile memory 118; while the key device 130 is connected to the unmanned aerial vehicle 110 via the serial port connector 134 connected to the serial port connector 116, decrypt, using the private key, the encrypted symmetric key to obtain the symmetric key; decrypt, using the symmetric key, the encrypted media data to obtain decrypted media data; and transmit a portion of the decrypted media data. For example, the portion of the decrypted media data may be transmitted to the controller 120 for the unmanned aerial vehicle 110. In some implementations, the processing apparatus 112 may be configured to receive the public key from the key device 130 via the serial port connector 134 connected to the serial port connector 116.

When the key device 130 is connected to the unmanned aerial vehicle 110 to enable decryption of media data, a decrypted symmetric key may be transferred to unmanned aerial vehicle 110. The unmanned aerial vehicle 110 may be configured to take steps to protect the symmetric key and prevent the symmetric key from being recovered from the unmanned aerial vehicle 110 (e.g., in the event the unmanned aerial vehicle 110 is lost during a flight). For example, the processing apparatus 112 may be configured to store the symmetric key in volatile memory of the unmanned aerial vehicle; and continue to decrypt, using the symmetric key, portions of the encrypted media data to obtain decrypted media data and transmit portions of the decrypted media data after the key device has been disconnected from the unmanned aerial vehicle. In some implementations, the processing apparatus 112 is configured to, responsive to initiation of a takeoff procedure for the unmanned aerial vehicle 110, delete the symmetric key from memory of the unmanned aerial vehicle. For example, when a command to takeoff is received by the unmanned aerial vehicle 110 from the controller 120, the unmanned aerial vehicle 110 may delete the symmetric key it had been using for decryption, thus preventing a potentially hostile party that finds or captures the drone from accessing the symmetric key to decrypt media data stored in the unmanned aerial vehicle 110.

Figure 2A:
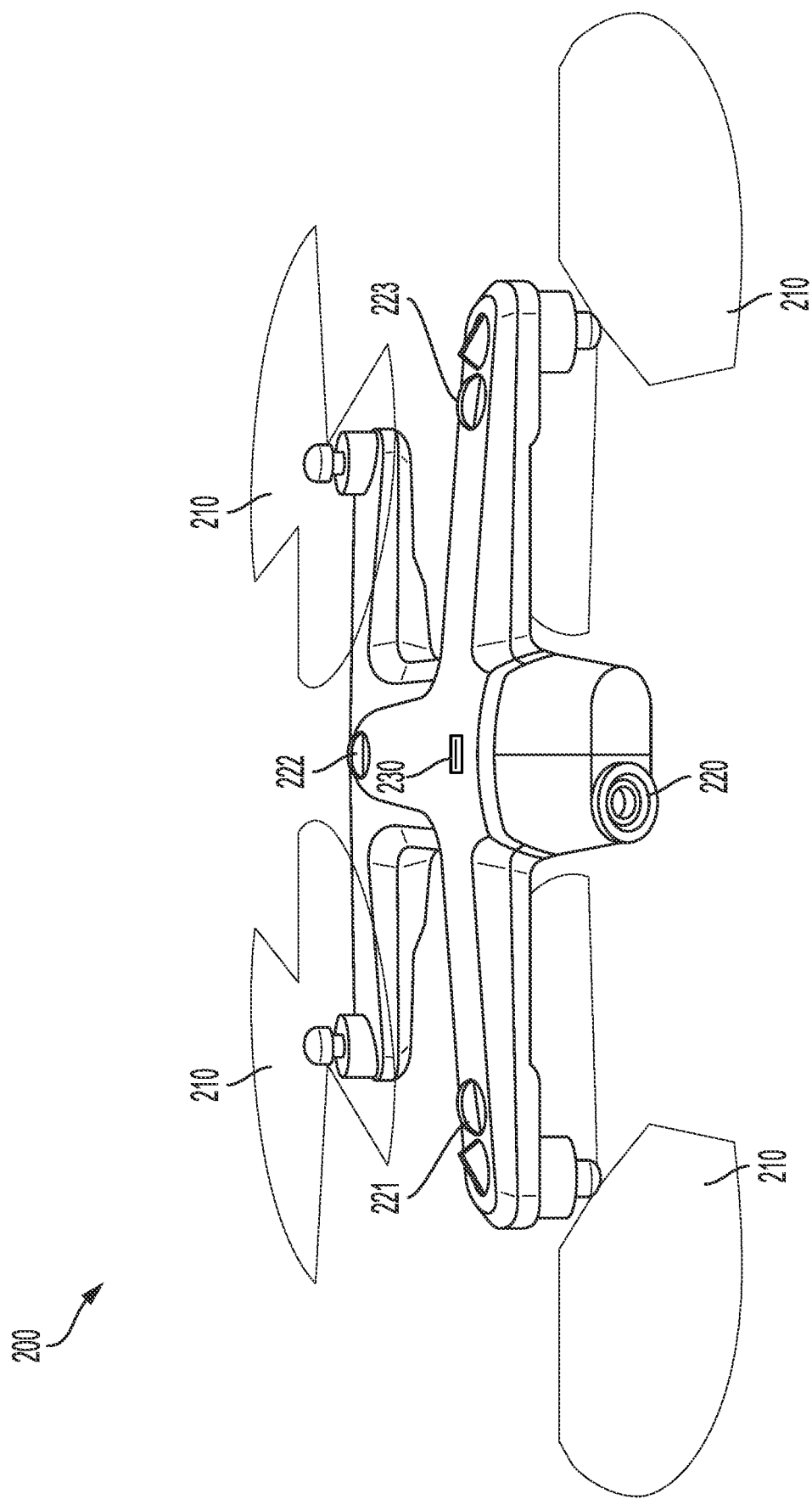
FIG. 2A is an illustration of an example of an unmanned aerial vehicle configured for use with a security key.

FIG. 2A is an illustration of an example of an unmanned aerial vehicle 200 configured for use with a security key as seen from above. The unmanned aerial vehicle 200 includes a propulsion mechanism 210 including four propellers and motors configured to spin the propellers. For example, the unmanned aerial vehicle 200 may be a quad-copter drone. The unmanned aerial vehicle 200 includes image sensors, including a high-resolution image sensor 220 that mounted on a gimbal to support steady, low-blur image capture and object tracking. For example, the image sensor 220 may be used for high resolution scanning of objects of interest during a flight. The unmanned aerial vehicle 200 also includes lower resolution image sensors 221, 222, and 223 that are spaced out around the top of the unmanned aerial vehicle 200 and covered by respective fisheye lenses to provide a wide field of view and support stereoscopic computer vision. The unmanned aerial vehicle 200 includes a female serial port connector 230 configured to connect with a male serial port connector of a key device (e.g., the key device 300 of FIG. 3) configured to store a private key. For example, the female serial port connector 230 may include a USB-C receptacle or a USB-A receptacle. The female serial port connector 116 may implement a serial port protocol (e.g., USB, I2C or SPI) for communications with a connected device, such as the key device 130. The unmanned aerial vehicle 200 also includes an internal processing apparatus (not shown in FIG. 2A). For example, the unmanned aerial vehicle 200 may include the hardware configuration 400 of FIG. 4.

Figure 2B:
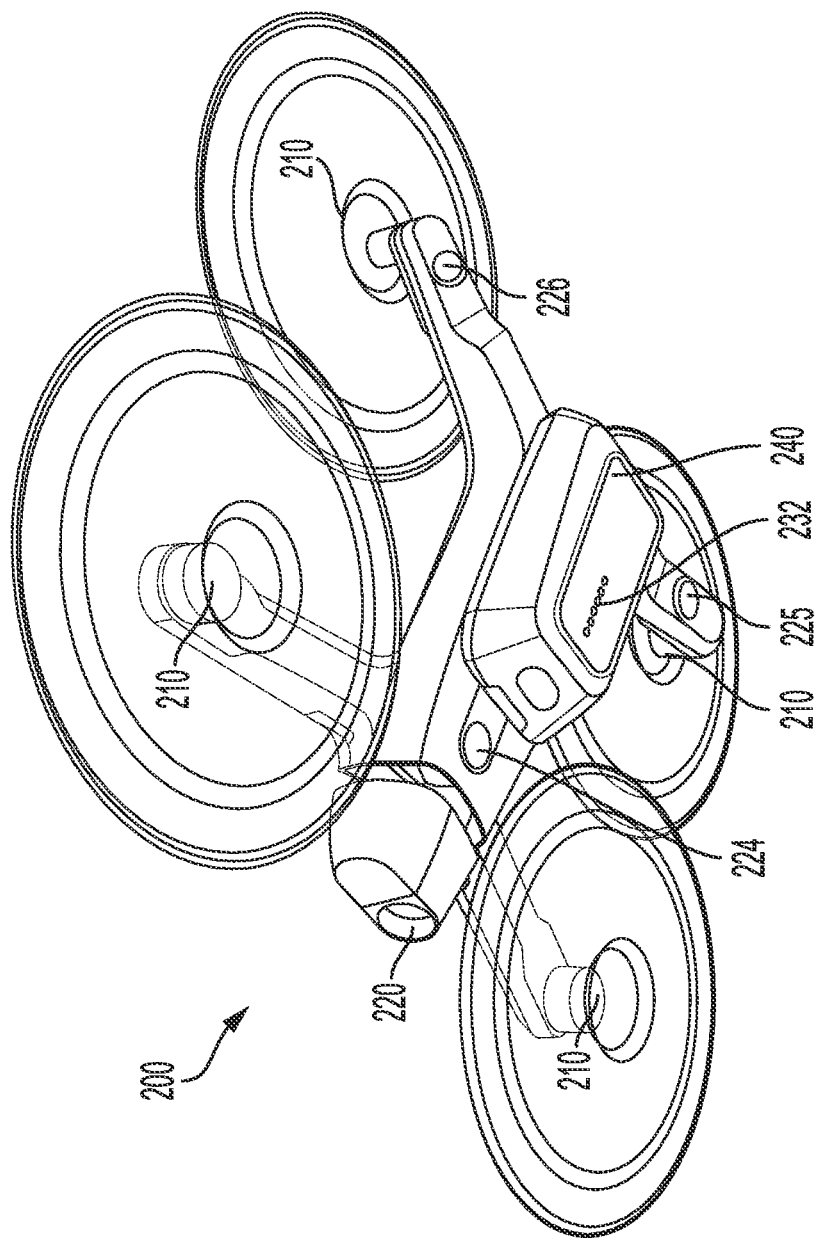
FIG. 2B is an illustration of an example of an unmanned aerial vehicle configured for use with a security key as seen from below.

FIG. 2B is an illustration of an example of an unmanned aerial vehicle 200 configured for use with a security key as seen from below. From this perspective three more image sensors arranged on the bottom of the unmanned aerial vehicle 200 may be seen: the image sensor 224, the image sensor 225, and the image sensor 226. These image sensors (224-226) may also be covered by respective fisheye lenses to provide a wide field of view and support stereoscopic computer vision. This array of image sensors (220-226) may enable visual inertial odometry (VIO) for high resolution localization and obstacle detection and avoidance. For example, the array of image sensors (220-226) may be used to capture media data (e.g., frames of video or still images) that may be encrypted using a symmetric key that is in turn encrypted with a public key received from a key device (e.g., the key device 130).

The unmanned aerial vehicle 200 may be configured for autonomous landing on a landing surface. The unmanned aerial vehicle 200 also includes a battery in battery pack 240 attached on the bottom of the unmanned aerial vehicle 200, with conducting contacts 232 to enable battery charging.

Figure 2C:
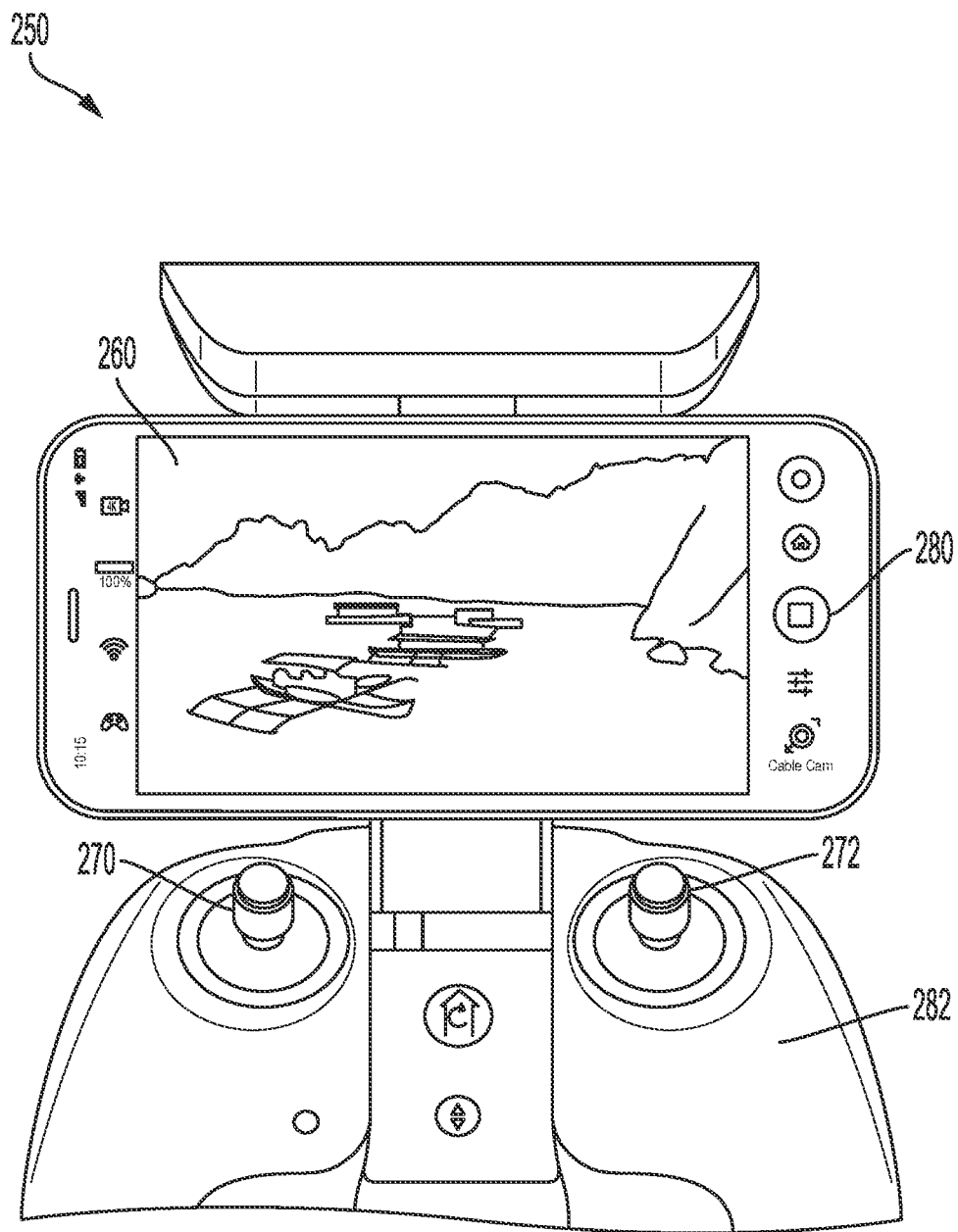
FIG. 2C is an illustration of an example of a controller for an unmanned aerial vehicle.

FIG. 2C is an illustration of an example of a controller 250 for an unmanned aerial vehicle. The controller 250 may provide a user interface for controlling the unmanned aerial vehicle and reviewing data (e.g., images) received from the unmanned aerial vehicle. The controller 250 includes a touchscreen 260; a left joystick 270; and a right joystick 272. In this example, the touchscreen 260 is part of a smartphone 280 that connects to controller attachment 282, which, in addition to providing addition control surfaces including the left joystick 270 and the right joystick 272, may provide range extending communication capabilities for longer distance communication with the unmanned aerial vehicle. The controller 250 may provide a user interface for enabling or disabling encryption of media data captured by the unmanned aerial vehicle 200 after a public key has been acquired by the unmanned aerial vehicle 200 from a key device (e.g., the key device 130).

In some implementations, processing (e.g., image processing and control functions) may be performed by an application running on a processor of a remote controller device (e.g., the controller 250 or a smartphone) for an unmanned aerial vehicle being controlled using the remote controller device. Such a remote controller device may provide the interactive features, where the app provides all the functionalities using the video content provided by the unmanned aerial vehicle. For example, various steps of the processes 500 600, 700, and 800 of FIGS. 5-8 may be implemented using a processor of a remote controller device (e.g., the controller 250 or a smartphone) that is in communication with an unmanned aerial vehicle to control the unmanned aerial vehicle.

Software running on a processing apparatus in an unmanned aerial vehicle and/or on a processing apparatus in a dock for the unmanned aerial vehicle may be used to implement the autonomous landing techniques described herein.

For example, a robust estimation and re-localization procedure may include visual relocalization of a dock with a landing surface at multiple scales. For example, the unmanned aerial vehicle software may support a GPS→visual localization transition. In some implementations, arbitrary fiducial (e.g., visual tag) designs, sizes, and orientations around dock may be supported. For example, software may enable detection and rejection of spurious detections.

For example, a takeoff and landing procedure for the unmanned aerial vehicle may include robust planning & control in wind using model-based wind estimation and/or model-based wind compensation. For example, a takeoff and landing procedure for the unmanned aerial vehicle may include a landing "honing procedure," which may stop shortly above the landing surface of a dock. Since state estimation and visual detection is more accurate than control in windy environments, wait until the position, velocity, and angular error between the actual vehicle and fiducial on the landing surface is low before committing to land. For example, a takeoff and landing procedure for the unmanned aerial vehicle may include a dock-specific landing detection and abort procedure. For example, actual contact with dock may be detected and the system may differentiate between a successful landing and a near-miss. For example, a takeoff and landing procedure for the unmanned aerial vehicle may include employing a slow, reverse motor spin to enable self-retracting propellers.

In some implementations, a takeoff and landing procedure for the unmanned aerial vehicle may include support for failure cases and fallback behavior, such as, setting a predetermined land position in the case of failure; going to another box; an option to land on top of dock if box is jammed, etc.

For example, an application programming interface design may be provided for single-drone, single-dock operation. For example, skills may be performed based on a schedule, or as much as possible given battery life or recharge rate.

For example, an application programming interface design for N drones with M docks operation may be provided. In some implementations, mission parameters may be defined, such that, unmanned aerial vehicles (e.g., drones) are automatically dispatched and recalled to constantly satisfy mission parameters with overlap.

An unmanned aerial vehicle may be configured to automatically fold propellers to fit in the dock. For example, the dock may be smaller than the full unmanned aerial vehicle. Persistent operation can be achieved with multiple unmanned aerial vehicles docking, charging, performing missions, waiting in standby to dock, and/or charging in coordination. In some implementations, an unmanned aerial vehicle is automatically serviced while it is in position within the dock. For example, automated servicing of an unmanned aerial vehicle may include charging a battery, cleaning sensors, cleaning and/or drying the unmanned aerial vehicle more generally, changing a propeller, and/or changing a battery.

An unmanned aerial vehicle may track its state (e.g., a pose including a position and an orientation) using a combination of sensing modalities (e.g., visual inertial odometry (VIO) and global positioning system (GPS) based operation) to provide robustness against drift.

Figure 3:
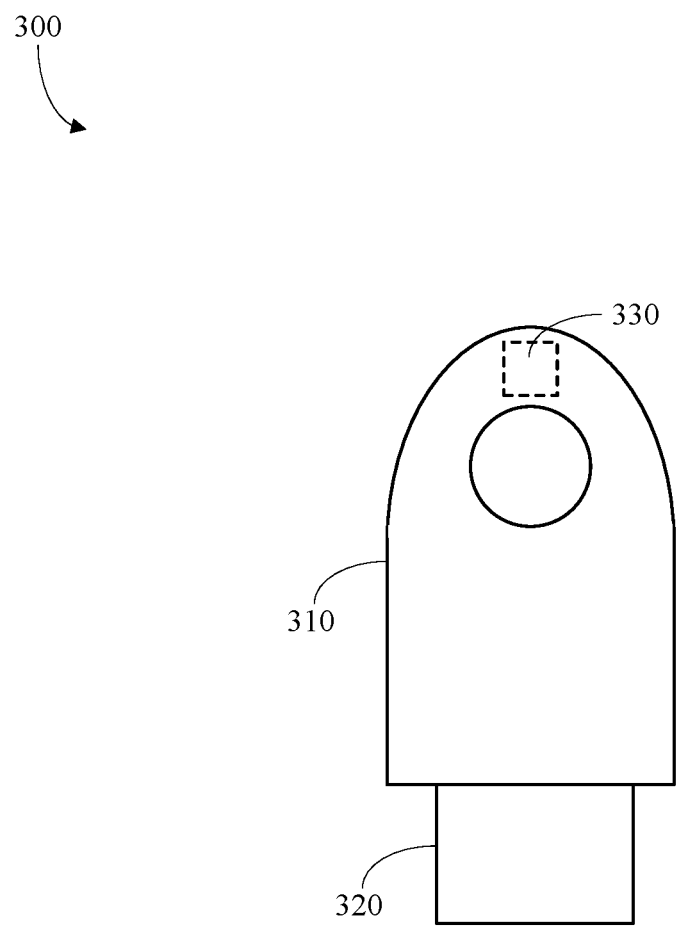
FIG. 3 is an illustration of an example of a key device for securely storing and accessing media data on an unmanned aerial vehicle.

FIG. 3 is an illustration of an example of a key device 300 for securely storing and accessing media data on an unmanned aerial vehicle. The key device 300 includes a body 310, a male serial port connector 320, and a light emitting diode 330. For example, the body 310 may be made of plastic. The key device 300 includes a memory, inside the body 310, that stores data including a public key and a private key, paired with the public key. The public key may be used to encrypt a symmetric key used to encrypt media data captured by an unmanned aerial vehicle (e.g., the unmanned aerial vehicle 200) after the public key has been transmitted from the key device 300 to the unmanned aerial vehicle via the male serial port connector 320 in an encryption provisioning operation. The private key may be used to decrypt the encrypted symmetric key that may then be used to decrypt media data on an unmanned aerial vehicle while the key device 300 is connected to the unmanned aerial vehicle via the male serial port connector 320. For example, the key device 300 may then be connected to the unmanned aerial vehicle after it lands to enable decryption of some or all of the encrypted media data that was encrypted using a symmetric key during a flight of the unmanned aerial vehicle where the symmetric key was also encrypted using the public key.

For example, the male serial port connector 320 may include a USB-C plug or a USB-A plug. The male serial port connector 320 may implement a serial port protocol (e.g., USB, I2C or SPI) for communications with a connected device, such as the unmanned aerial vehicle 110.

The key device 300 includes a light emitting diode 330 and the key device 300 may be configured to blink the light emitting diode while performing an encryption provisioning operation, including transmitting the public key to a processing apparatus of an unmanned aerial vehicle via the male serial port connector 320 connected to a female serial port connector of the unmanned aerial vehicle, and turn off the light emitting diode 330 responsive to completion of the encryption provisioning operation. For example, the key device 300 may be configured to blink the light emitting diode 330 while performing a decryption operation; including decrypting, using the private key, a portion of encrypted media data to obtain decrypted media data; and turn off the light emitting diode 330 responsive to completion of the decryption operation. In some implementations, the body 310 is partially transparent and light from the light emitting diode 330 shines through a portion of the body 310. Blinking the light emitting diode 330 during an operation (e.g., an encryption provisioning operation or a decryption operation) and turning off the light emitting diode 330 when the operation is complete may serve to inform a user when it is safe and/or appropriate to disconnect the key device 300 from an unmanned aerial vehicle.

Figure 4:
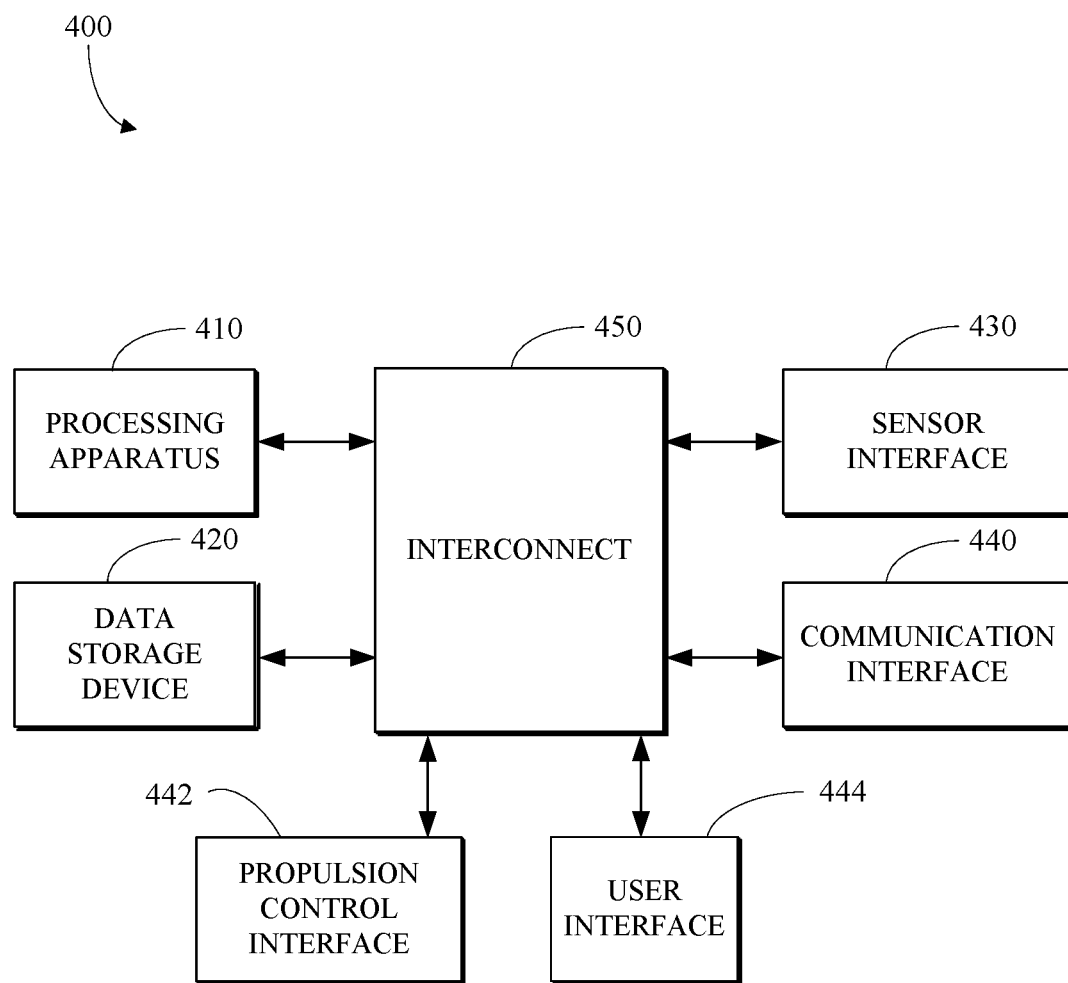
FIG. 4 is a block diagram of an example of a hardware configuration of an unmanned aerial vehicle.

FIG. 4 is a block diagram of an example of a hardware configuration 400 of an unmanned aerial vehicle. The hardware configuration 400 may include a processing apparatus 410, a data storage device 420, a sensor interface 430, a communications interface 440, propulsion control interface 442, a user interface 444, and an interconnect 450 through which the processing apparatus 410 may access the other components. For example, the hardware configuration 400 may be or be part of an unmanned aerial vehicle (e.g., the unmanned aerial vehicle 200). For example, the unmanned aerial vehicle may be configured to encrypt media data captured during a flight using a symmetric key that is encrypted with a public key and decrypt the media data with the symmetric key after it has been decrypted using a private key that is stored on a key device (e.g., the key device 130) while the key device is removably connected to the unmanned aerial vehicle via a serial port connector (e.g., a USB connector).

The processing apparatus 410 is operable to execute instructions that have been stored in a data storage device 420. In some implementations, the processing apparatus 410 is a processor with random access memory for temporarily storing instructions read from the data storage device 420 while the instructions are being executed. The processing apparatus 410 may include single or multiple processors each having single or multiple processing cores. Alternatively, the processing apparatus 410 may include another type of device, or multiple devices, capable of manipulating or processing data. For example, the data storage device 420 may be a non-volatile information storage device such as, a solid-state drive, a read-only memory device (ROM), an optical disc, a magnetic disc, or any other suitable type of storage device such as a non-transitory computer readable memory. The data storage device 420 may include another type of device, or multiple devices, capable of storing data for retrieval or processing by the processing apparatus 410. The processing apparatus 410 may access and manipulate data stored in the data storage device 420 via interconnect 450. For example, the data storage device 420 may store instructions executable by the processing apparatus 410 that upon execution by the processing apparatus 410 cause the processing apparatus 410 to perform operations (e.g., operations that implement the process 500 of FIG. 5, the process 600 of FIG. 6, the process 700 of FIG. 7, and/or the process 800 of FIG. 8).

The sensor interface 430 may be configured to control and/or receive data (e.g., temperature measurements, pressure measurements, a global positioning system (GPS) data, acceleration measurements, angular rate measurements, magnetic flux measurements, and/or a visible spectrum image) from one or more sensors (e.g., including the image sensor 220). In some implementations, the sensor interface 430 may implement a serial port protocol (e.g., I2C or SPI) for communications with one or more sensor devices over conductors. In some implementations, the sensor interface 430 may include a wireless interface for communicating with one or more sensor groups via low-power, short-range communications (e.g., a vehicle area network protocol).

The communications interface 440 facilitates communication with other devices, for example, a paired dock, a specialized controller (e.g., the controller 250), or a user computing device (e.g., a smartphone or tablet). For example, the communications interface 440 may include a wireless interface, which may facilitate communication via a Wi-Fi network, a Bluetooth link, or a ZigBee link. For example, the communications interface 440 may include a wired interface, which may facilitate communication via a serial port (e.g., RS-232 or USB). The communications interface 440 facilitates communication via a network.

The propulsion control interface 442 may be used by the processing apparatus to control a propulsion system (e.g., including one or more propellers driven by electric motors). For example, the propulsion control interface 442 may include circuitry for converting digital control signals from the processing apparatus 410 to analog control signals for actuators (e.g., electric motors driving respective propellers). In some implementations, the propulsion control interface 442 may implement a serial port protocol (e.g., I2C or SPI) for communications with the processing apparatus 410. In some implementations, the propulsion control interface 442 may include a wireless interface for communicating with one or more motors via low-power, short-range communications (e.g., a vehicle area network protocol).

The user interface 444 allows input and output of information from/to a user. In some implementations, the user interface 444 can include a display, which can be a liquid crystal display (LCD), a light emitting diode (LED) display (e.g., an OLED display), or other suitable display. For example, the user interface 444 may include a touchscreen. For example, the user interface 444 may include buttons. For example, the user interface 444 may include a positional input device, such as a touchpad, touchscreen, or the like; or other suitable human or machine interface devices.

For example, the interconnect 450 may be a system bus, or a wired or wireless network (e.g., a vehicle area network). In some implementations (not shown in FIG. 4), some components of the unmanned aerial vehicle may be omitted, such as the user interface 444.

Figure 5:
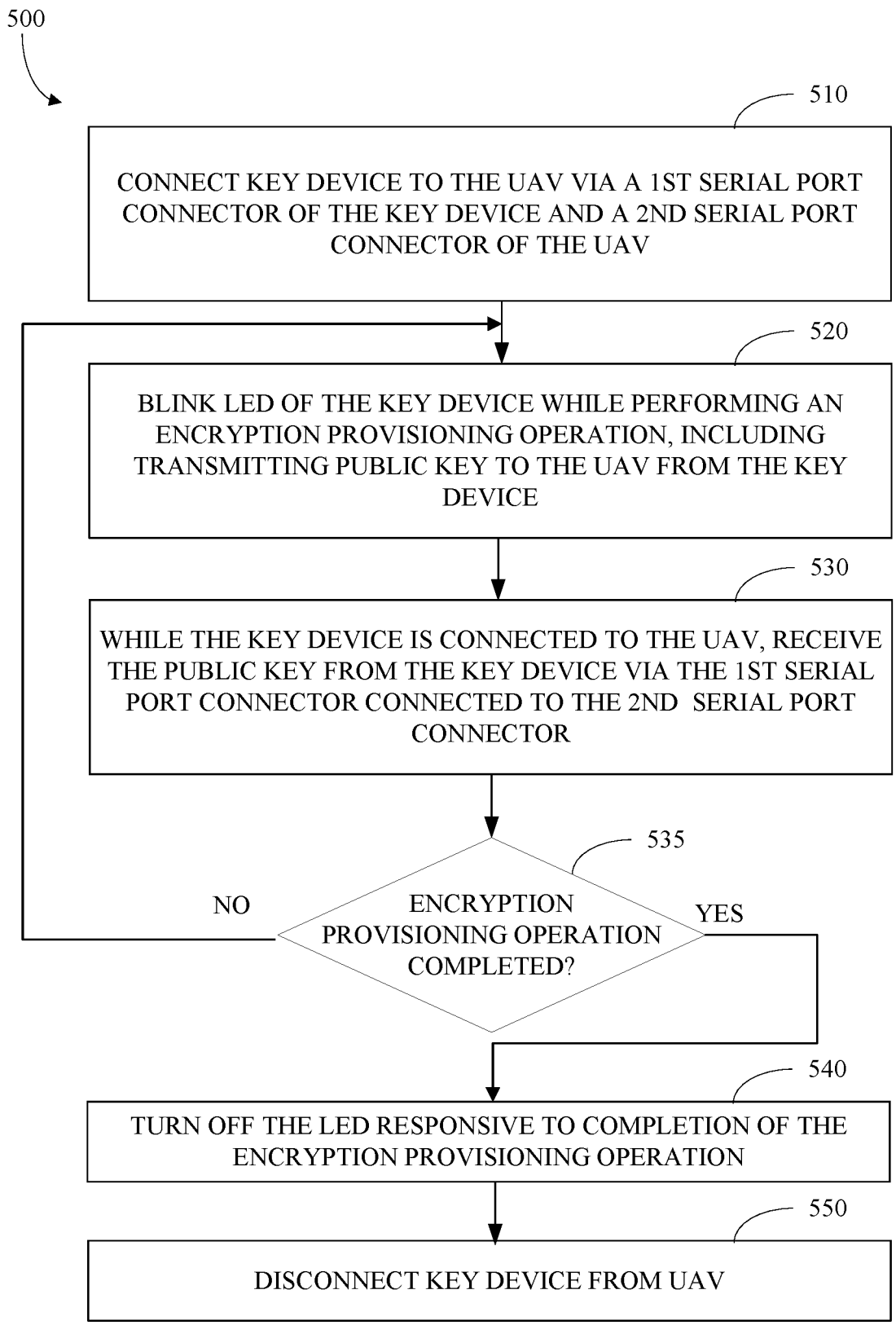
FIG. 5 is a flowchart of an example of a process for provisioning an unmanned aerial vehicle for encryption using a security key.

FIG. 5 is a flowchart of an example of a process 500 for provisioning an unmanned aerial vehicle for encryption using a security key. The process 500 includes connecting 510 a key device to the unmanned aerial vehicle via a first serial port connector (e.g., a male serial port connector) of the key device and a second serial port connector (e.g., a female serial port connector) of the unmanned aerial vehicle; blinking 520 a light emitting diode of the key device while performing an encryption provisioning operation, including transmitting the public key to the unmanned aerial vehicle via the first serial port connector connected to the second serial port connector; while the key device is connected to the unmanned aerial vehicle via the first serial port connector connected to the second serial port connector, receiving 530 the public key from the key device via the first serial port connector connected to the second serial port connector; responsive to completion (at 535) of the encryption provisioning operation, turning off 540 the light emitting diode; and disconnecting 550 the key device from the unmanned aerial vehicle. For example, the process 500 may be implemented by the unmanned aerial vehicle 110 of FIG. 1. For example, the process 500 may be implemented by the unmanned aerial vehicle 200 of FIGS. 2A-B. For example, the process 500 may be implemented using the hardware configuration 400 of FIG. 4.

The process 500 includes, blinking a light emitting diode of the key device while performing an encryption provisioning operation, including transmitting 520 the public key to the unmanned aerial vehicle via the first serial port connector connected to the second serial port connector. For example, the public key may be transmitted 520 using a serial port protocol (e.g., USB or I2C). Blinking the light emitting diode may provide a status update to a user of the status of the encryption provisioning operation and inform the user when the key device should be removed from the unmanned aerial vehicle.

The process 500 includes, while the key device is connected to the unmanned aerial vehicle via the first serial port connector connected to the second serial port connector, receiving 530 the public key from the key device via the first serial port connector connected to the second serial port connector. The public key may be received via communications over the serial port that the key device is attached to. For example, the public key may be received 530 using the communication interface 440.

In some implementations, after the encryption provisioning operation has been completed, encryption of media data captured by the unmanned aerial vehicle may be enabled or disabled via a user interface (e.g., a webpage) that is transmitted to a computing device (e.g., the controller 250, a smartphone, or a tablet that communicates with the unmanned aerial vehicle. For example, the user interface may include an encryption enable icon and/or an encryption disable icon that a user can interact with (e.g., using a mouse) to enable or disable encryption of captured media data.

Figure 6:
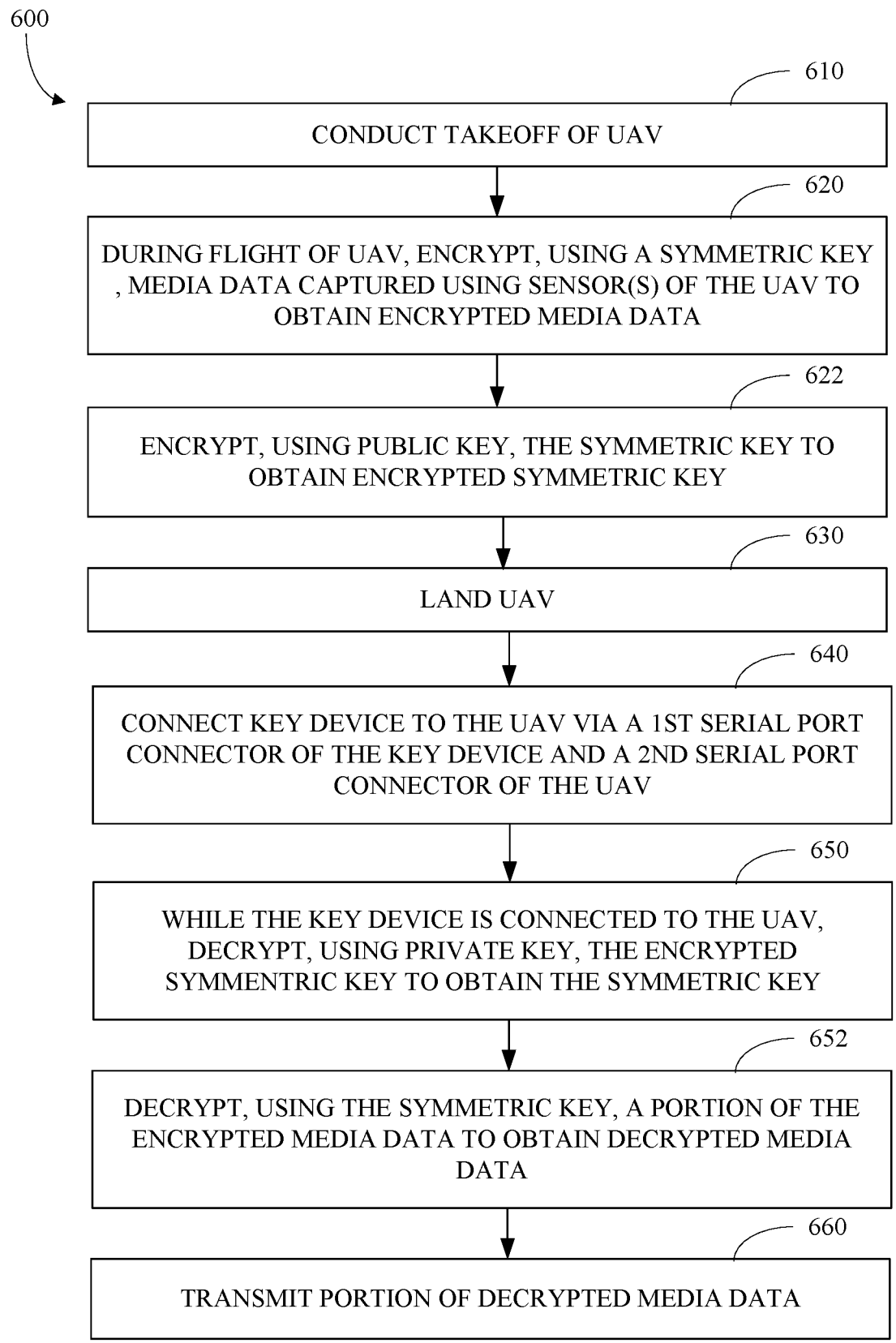
FIG. 6 is a flowchart of an example of a process for securely capturing media data using an unmanned aerial vehicle and accessing the media data using a security key.

FIG. 6 is a flowchart of an example of a process 600 for securely capturing media data using an unmanned aerial vehicle and accessing the media data using a security key. The process 600 includes conducting a takeoff 610 of an unmanned aerial vehicle; during flight of an unmanned aerial vehicle, encrypting 620, using a symmetric key, media data captured using one or more sensors of the unmanned aerial vehicle to obtain encrypted media data; encrypting 622, using a public key stored by the unmanned aerial vehicle, the symmetric key to obtain an encrypted symmetric key, wherein the public key is paired to a private key stored by a key device that is disconnected from the unmanned aerial vehicle during flight; landing 630 the unmanned aerial vehicle; connecting 640 the key device to the unmanned aerial vehicle via a first serial port connector of the key device and a second serial port connector of the unmanned aerial vehicle; while the key device is connected to the unmanned aerial vehicle via the first serial port connector connected to the second serial port connector, decrypting 650, using the private key, the encrypted symmetric key to obtain the symmetric key; decrypting 652, using the symmetric key, a portion of the encrypted media data to obtain decrypted media data; and transmitting 660 a portion of the decrypted media data. For example, the process 600 may be implemented by the unmanned aerial vehicle 110 of FIG. 1. For example, the process 600 may be implemented by the unmanned aerial vehicle 200 of FIGS. 2A-B. For example, the process 600 may be implemented using the hardware configuration 400 of FIG. 4.

The process 600 includes, during flight of an unmanned aerial vehicle (e.g., the unmanned aerial vehicle 110), encrypting 620, using a symmetric key, media data captured using one or more sensors (e.g., the image sensor 220) of the unmanned aerial vehicle to obtain encrypted media data. Various encryption algorithms (e.g., 128-bit AES or 256-bit AES) may be used with the symmetric key to encrypt 620 the media data. In some implementations, a new symmetric key is generated for each new flight and/or periodically during a flight. For example, the symmetric key may be generated randomly using a pseudorandom key generator or a true random number generator.

The process 600 includes, encrypting 622, using a public key stored by the unmanned aerial vehicle, the symmetric key to obtain an encrypted symmetric key. The public key is paired to a private key stored by a key device (e.g., the key device 130) that is disconnected from the unmanned aerial vehicle during flight. In some implementations, the public key has been acquired from the key device before the flight. For example, the process 500 of FIG. 5 may be implemented to transfer the public key from the key device to the unmanned aerial vehicle for use in encryption of captured media data. The public key is paired to the private key in the sense that data encrypted with the public key may be decrypted using the private key. The encrypted symmetric key may be stored with the encrypted media data in non-volatile memory of the unmanned aerial vehicle. Once the encrypted symmetric key has been stored and the unmanned aerial vehicle is finished using the symmetric key for encryption of newly captured media data, the symmetric key may be deleted from memory of the unmanned aerial vehicle to prevent compromise of the media data that has been encrypted with the symmetric key.

The process 600 includes landing 630 the unmanned aerial vehicle. For example, landing 630 of the unmanned aerial vehicles may be invoked by a command from a controller (e.g., the controller 250) of the unmanned aerial vehicle. In some implementations, the unmanned aerial vehicle is configured to automatically land on a landing surface of a dock for the unmanned aerial vehicle, which may facilitate recharging and other maintenance of the unmanned aerial vehicle.

The process 600 includes connecting 640 the key device to the unmanned aerial vehicle via a first serial port connector of the key device and a second serial port connector of the unmanned aerial vehicle. In some implementations, the first serial port connector is a universal serial bus plug and the second serial port connector is a universal serial bus receptacle. Connecting 640 the key device to the unmanned aerial vehicle may cause a communications link (e.g., a USB serial port link) between the unmanned aerial vehicle and the key device to be established. The communication link over the first serial port connector and the second serial port connector may be used to access the private key stored in the key device so that the private key may be used for decryption of media data.

The process 600 includes, while the key device (e.g., the key device 300) is connected to the unmanned aerial vehicle via the first serial port connector connected to the second serial port connector, decrypting 650, using the private key, the encrypted symmetric key to obtain the symmetric key. In some implementations, a light emitting diode of the key device (e.g., the light emitting diode 330) may be configured to provide an indication of the status or progress of a decryption operation. For example, the process 700 of FIG. 7 may be implemented to decrypt 650 the encrypted symmetric key to obtain the symmetric key. In some implementations, the private key is stored in a secure element of the key device and the encrypted symmetric key is decrypted by passing the encrypted symmetric key to the secure element in the key device for decryption and passing the resulting decrypted symmetric key back to the unmanned aerial vehicle for use in decryption of media data. For example, the process 900 of FIG. 9 may be implemented to decrypt 650 the encrypted symmetric key to obtain the symmetric key. This may prevent the private key from being exposed outside of the key device. In some implementations, the private key is read from the key device by the unmanned aerial vehicle, which uses the private key to decrypt the encrypted symmetric key with its own processor. For example, the private key may be received by a processing apparatus of the unmanned aerial vehicle from the key device via the first serial port connector connected to the second serial port connector. In some implementations, the memory of the key device may be memory mapped by a processor of the unmanned aerial vehicle and the private key may be temporarily stored in a microarchitectural data store (e.g., a register) of a processor of the unmanned aerial vehicle for use in decrypting 650 the encrypted symmetric key.

The process 600 includes, decrypting 652, using the symmetric key, a portion of the encrypted media data to obtain decrypted media data. Various decryption algorithms (e.g., 128-bit AES or 256-bit AES) may be used with the symmetric key to decrypt 652 the encrypted media data. In some implementations, the memory of the key device may be memory mapped by a processor of the unmanned aerial vehicle and the symmetric key may be temporarily stored in a microarchitectural data store (e.g., a register) of a processor of the unmanned aerial vehicle for use in decrypting 652 the encrypted media data. In some implementations, the symmetric key may be stored in other types of volatile memory (e.g., random access memory (RAM)) of the unmanned aerial vehicle for use in decrypting 650 portions of the encrypted media data while the key device continues to be connected and/or after the key device has been disconnected from the unmanned aerial vehicle. For example, the process 800 of FIG. 8 may be implemented to continue decryption of media data after the key device has been disconnected while protecting the symmetric key from being exposed to adversaries in a lost unmanned aerial vehicle. For example, takeoff of the unmanned aerial vehicle may trigger a deletion of the symmetric key from all memory of the unmanned aerial vehicle.

The process 600 includes transmitting 660 a portion of the decrypted media data. The decrypted media may be presented to a user after the key device has been connected to the unmanned aerial vehicle. For example, the portion of the decrypted media data may be transmitted 660 to a controller (e.g., the controller 250) for the unmanned aerial vehicle. In some implementations, a portion of the decrypted media data may be transmitted 660 from the unmanned aerial vehicle to another computing device (e.g., a smartphone, tablet, or laptop) that can be used by a user to view and/or listen to the decrypted media data. For example, a portion of the decrypted media data may be transmitted 660 via the communication interface 440.

Figure 7:
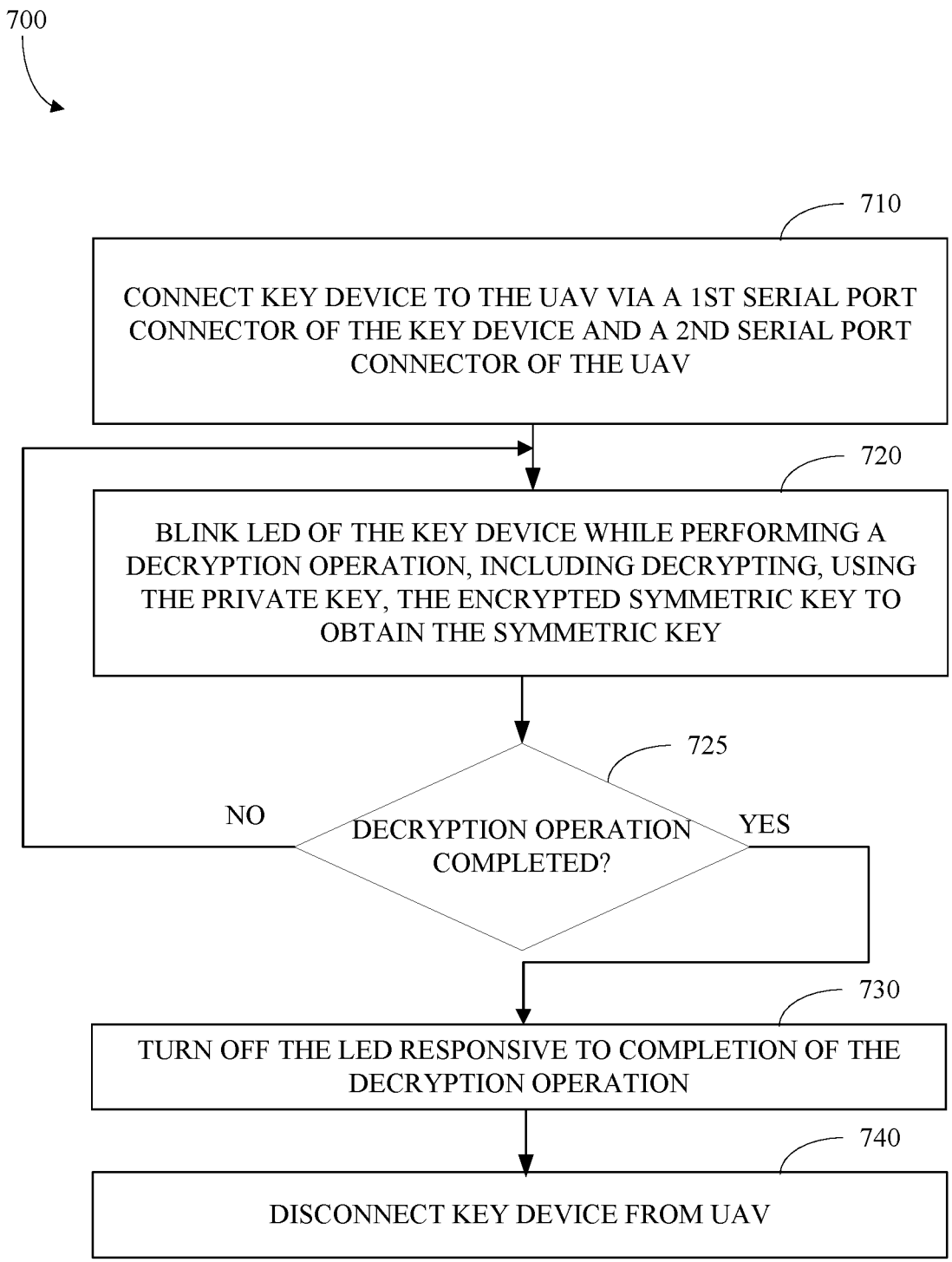
FIG. 7 is a flowchart of an example of a process for accessing securely stored media data of an unmanned aerial vehicle using a security key.

FIG. 7 is a flowchart of an example of a process 700 for accessing securely stored media data of an unmanned aerial vehicle using a security key. The process 700 includes connecting 710 the key device to the unmanned aerial vehicle via a first serial port connector of the key device and a second serial port connector of the unmanned aerial vehicle; blinking 720 a light emitting diode of the key device while performing a decryption operation to obtain decrypted media data; turning off 730 the light emitting diode responsive to completion (at 725) of the decryption operation; and disconnecting 740 the key device from the unmanned aerial vehicle. For example, the process 700 may be implemented by the unmanned aerial vehicle 110 of FIG. 1. For example, the process 700 may be implemented by the unmanned aerial vehicle 200 of FIGS. 2A-B. For example, the process 700 may be implemented using the hardware configuration 400 of FIG. 4.

The process 700 includes blinking 720 a light emitting diode of the key device while performing a decryption operation. The decryption operation includes decrypting, using the private key, the encrypted symmetric key to obtain the symmetric key. In some implementations, the decryption operation also includes decrypting, using the symmetric key, a portion of the encrypted media data to obtain the decrypted media data. For example, the decryption operation may decrypt enough of an encrypted media file stored on the unmanned aerial vehicle to enable the display of a thumbnail representing the encrypted media file in a user interface that is transmitted to a controller (e.g., the controller 250) or another device (e.g., a smartphone, a tablet, or a laptop). In some implementations, a complete encrypted media file stored on the unmanned aerial vehicle is decrypted as part of the decryption operation. In some implementations, all of the encrypted media data stored on the unmanned aerial vehicle is decrypted as part of the decryption operation.

Figure 8:
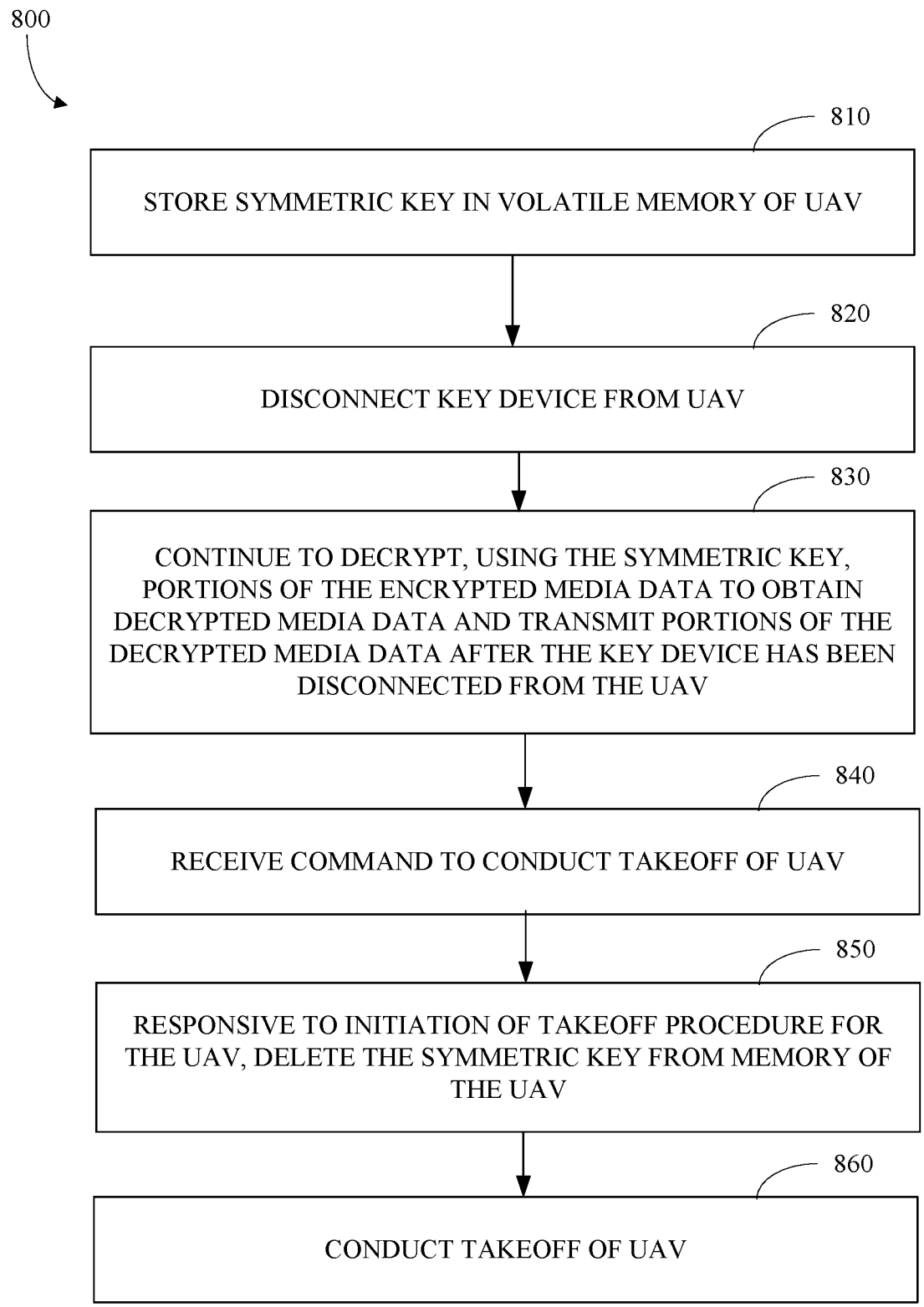
FIG. 8 is a flowchart of an example of a process for using a symmetric key that has been decrypted using a private key from a key device connected to an unmanned aerial vehicle.

FIG. 8 is a flowchart of an example of a process 800 for using a symmetric key that has been decrypted using a private key from a key device connected to an unmanned aerial vehicle. The process 800 includes storing 810 the symmetric key in volatile memory of the unmanned aerial vehicle; disconnecting 820 the key device from the unmanned aerial vehicle; continuing to decrypt 830, using the symmetric key, portions of the encrypted media data to obtain decrypted media data and transmit portions of the decrypted media data after the key device has been disconnected from the unmanned aerial vehicle; receiving 840 a command to conduct takeoff of the unmanned aerial vehicle; responsive to initiation of a takeoff procedure for the unmanned aerial vehicle, deleting 850 the symmetric key from memory of the unmanned aerial vehicle; and conducting a takeoff 860 of the unmanned aerial vehicle. For example, the process 800 may be implemented by the unmanned aerial vehicle 110 of FIG. 1. For example, the process 800 may be implemented by the unmanned aerial vehicle 200 of FIGS. 2A-B. For example, the process 800 may be implemented using the hardware configuration 400 of FIG. 4.

The process 800 includes storing the symmetric key in volatile memory of the unmanned aerial vehicle. For example, the volatile memory may include random access memory and or data storage circuitry of a processor, such as one or more registers. By storing the symmetric key in volatile memory, rather than non-volatile memory, the chances of compromise of the symmetric key may be reduced. For example, a power loss event (e.g., the battery of the unmanned aerial vehicle becomes depleted) would cause the copy of the symmetric key stored on the unmanned aerial vehicle to be lost and thus protected from someone gaining access to the unmanned aerial vehicle after the power loss event.

The process 800 includes continuing to decrypt 830, using the symmetric key, portions of the encrypted media data to obtain decrypted media data and transmit portions of the decrypted media data after the key device has been disconnected from the unmanned aerial vehicle. For example, a user may send commands from a controller (e.g., the controller 250) or another device (e.g., a smartphone, a tablet, or a laptop) to the unmanned aerial vehicle to access different encrypted media files or different portions of encrypted media files stored on the unmanned aerial vehicle. These files or portions of files may be decrypted 830 as need on demand using the stored 810 copy of the symmetric key after the key device has been disconnected from the unmanned aerial vehicle. In some implementations, multiple decrypted symmetric keys are stored 810 to facilitate decryption, where each symmetric key is associate with a respective subset of the encrypted media data that was captured at different times and encrypted with different respective symmetric keys that were in use for encryption at those times.

The process 800 includes responsive to initiation of a takeoff procedure for the unmanned aerial vehicle, deleting 850 the symmetric key from memory of the unmanned aerial vehicle. The unmanned aerial vehicle may be at higher risk for compromise when it is in flight and physically distant from its user or operator. For example, the unmanned aerial vehicle may be lost or disabled by unexpected disturbances, obstacles, or attacks while it is in flight. Therefore, it may be prudent to remove the symmetric key from all memory of the unmanned aerial vehicle prior to takeoff so this key and the encrypted media data stored on the unmanned aerial vehicle may be better protected from compromise. When a command to takeoff is received 840 and the preparations for takeoff are initiated, the symmetric key is deleted 850 from memory of the unmanned aerial vehicle. In some implementations, deleting 850 the symmetric key includes overwriting the memory location that held the symmetric key with different data values (e.g., a random number or some other data to obscure the symmetric key value that was stored there.

Figure 9:
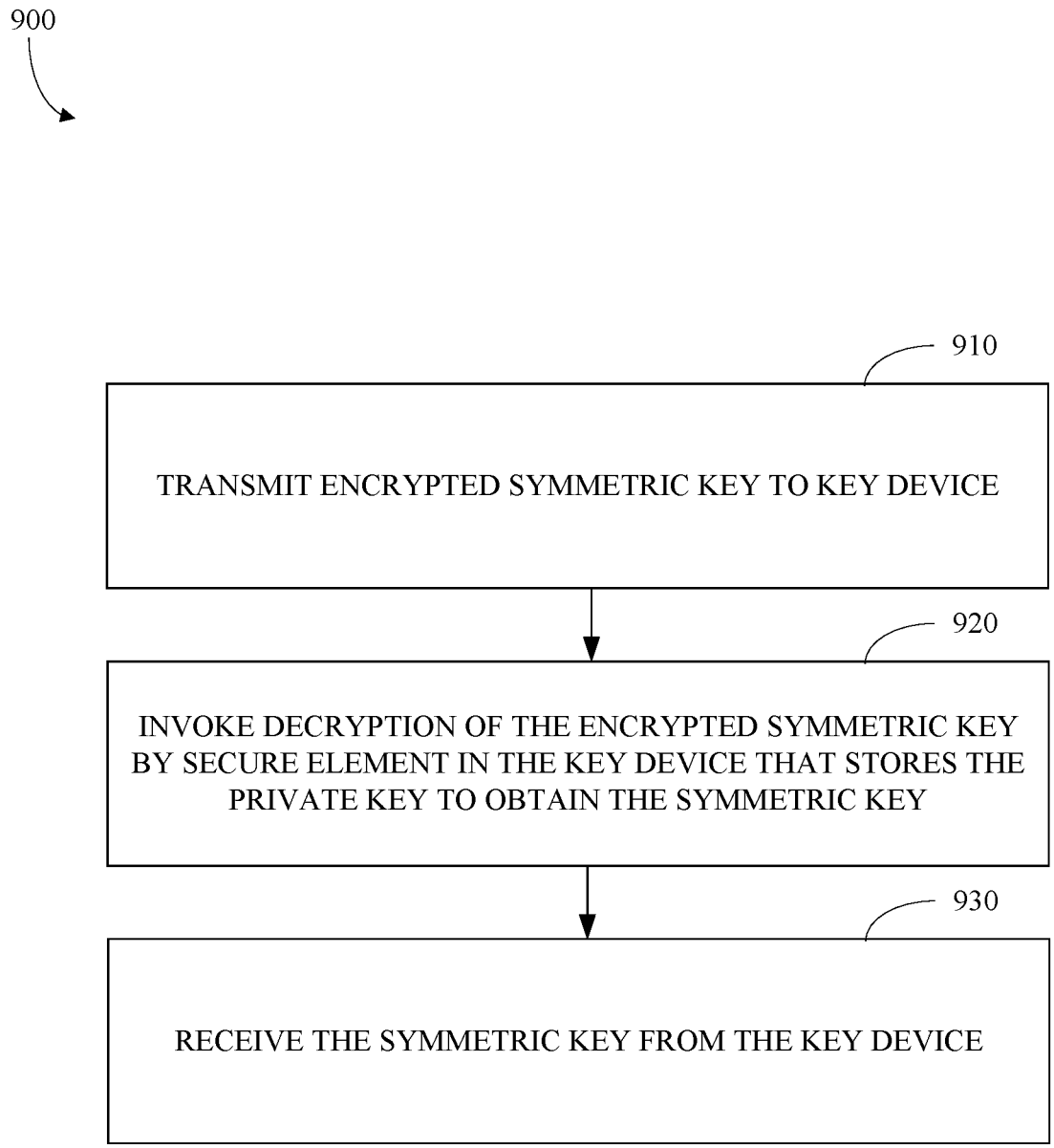
FIG. 9 is a flowchart of an example of a process for decrypting an encrypted symmetric key using a private key that is stored by a secure element in a key device.

FIG. 9 is a flowchart of an example of a process 900 for decrypting an encrypted symmetric key using a private key that is stored by a secure element in a key device. The process 900 includes transmitting 910 the encrypted symmetric key to the key device. The encrypted symmetric key may be transmitted 910 via the first serial port connector of the key device connected to the second serial port connector of the unmanned aerial vehicle. The process 900 includes invoking 920 decryption of encrypted symmetric key by a secure element in the key device that stores the private key to obtain the symmetric key. For example, the decryption may be invoked 920 by sending a request to the secure element of the key device. The process 900 includes receiving 930 the symmetric key from the key device. The symmetric key may be received 930 via the first serial port connector of the key device connected to the second serial port connector of the unmanned aerial vehicle.

Disclosed herein are implementations of a security key for an unmanned aerial vehicle.

In a first aspect, the subject matter described in this specification can be embodied in systems that include a key device including a memory and a first serial port connector, wherein the memory is configured to store a private key; and an unmanned aerial vehicle including, one or more sensors, a second serial port connector configured to connect with the first serial port connector, a non-volatile memory, and a processing apparatus, wherein the processing apparatus is configured to: store a public key, wherein the public key is paired to the private key; encrypt, using a symmetric key, media data captured using the one or more sensors to obtain encrypted media data; encrypt, using the public key, the symmetric key to obtain an encrypted symmetric key; store the encrypted media data and the encrypted symmetric key in the non-volatile memory; while the key device is connected to the unmanned aerial vehicle via the first serial port connector connected to the second serial port connector, decrypt, using the private key, the encrypted symmetric key to obtain the symmetric key; decrypt, using the symmetric key, a portion of the encrypted media data to obtain decrypted media data; and transmit a portion of the decrypted media data.

In a second aspect, the subject matter described in this specification can be embodied in methods that include during flight of an unmanned aerial vehicle, encrypting, using a symmetric key, media data captured using one or more sensors of the unmanned aerial vehicle to obtain encrypted media data; encrypting, using a public key stored by the unmanned aerial vehicle, the symmetric key to obtain an encrypted symmetric key, wherein the public key is paired to a private key stored by a key device that is disconnected from the unmanned aerial vehicle during flight; landing the unmanned aerial vehicle; connecting the key device to the unmanned aerial vehicle via a first serial port connector of the key device and a second serial port connector of the unmanned aerial vehicle; while the key device is connected to the unmanned aerial vehicle via the first serial port connector connected to the second serial port connector, decrypting, using the private key, the encrypted symmetric key to obtain the symmetric key; decrypting, using the symmetric key, a portion of the encrypted media data to obtain decrypted media data; and transmitting a portion of the decrypted media data.

In a third aspect, the subject matter described in this specification can be embodied in a non-transitory computer-readable storage medium that includes instructions that, when executed by a processor, facilitate performance of operations comprising: during flight of an unmanned aerial vehicle, encrypting, using a symmetric key, media data captured using one or more sensors of the unmanned aerial vehicle to obtain encrypted media data; encrypting, using a public key stored by the unmanned aerial vehicle, the symmetric key to obtain an encrypted symmetric key, wherein the public key is paired to a private key stored by a key device that is disconnected from the unmanned aerial vehicle during flight; landing the unmanned aerial vehicle; connecting the key device to the unmanned aerial vehicle via a first serial port connector of the key device and a second serial port connector of the unmanned aerial vehicle; while the key device is connected to the unmanned aerial vehicle via the first serial port connector connected to the second serial port connector, decrypting, using the private key, the encrypted symmetric key to obtain the symmetric key; decrypting, using the symmetric key, a portion of the encrypted media data to obtain decrypted media data; and transmitting a portion of the decrypted media data.

In a fourth aspect, the subject matter described in this specification can be embodied in unmanned aerial vehicles that include one or more sensors, a first serial port connector configured to connect with a second serial port connector of a key device configured to store a private key, and a processing apparatus, wherein the processing apparatus is configured to: store a public key, wherein the public key is paired to the private key; encrypt, using a symmetric key, media data captured using the one or more sensors to obtain encrypted media data; encrypt, using the public key, the symmetric key to obtain an encrypted symmetric key; delete the symmetric key; while the key device is connected to the unmanned aerial vehicle via the first serial port connector connected to the second serial port connector, decrypt, using the private key, the encrypted symmetric key to obtain the symmetric key; decrypt, using the symmetric key, a portion of the encrypted media data to obtain decrypted media data; and transmit a portion of the decrypted media data.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A system comprising:
   a key device including a memory and a first serial port connector, wherein the memory is configured to store a private key; and
   an unmanned aerial vehicle including, one or more sensors, a second serial port connector configured to connect with the first serial port connector, a non-volatile memory, and a processing apparatus, wherein the processing apparatus is configured to:

store a public key, wherein the public key is paired to the private key;

encrypt, using a symmetric key, media data captured using the one or more sensors to obtain encrypted media data;

encrypt, using the public key, the symmetric key to obtain an encrypted symmetric key;

store the encrypted media data and the encrypted symmetric key in the non-volatile memory;

while the key device is connected to the unmanned aerial vehicle via the first serial port connector connected to the second serial port connector, decrypt, using the private key, the encrypted symmetric key to obtain the symmetric key;

decrypt, using the symmetric key, a portion of the encrypted media data to obtain decrypted media data; and transmit a portion of the decrypted media data.

2. The system of claim 1, wherein the processing apparatus is configured to:

receive the public key from the key device via the first serial port connector connected to the second serial port connector.

3. The system of claim 2, wherein key device includes a light emitting diode and the key device is configured to:

blink the light emitting diode while performing an encryption provisioning operation, including transmitting the public key to the processing apparatus via the first serial port connector connected to the second serial port connector; and turn off the light emitting diode responsive to completion of the encryption provisioning operation.

4. The system of claim 1, wherein the memory of the key device that is configured to store the private key is part of a secure element in the key device, and wherein processing apparatus is configured to:

transmit the encrypted symmetric key to the key device;

invoke decryption of the encrypted symmetric key by the secure element using the private key to obtain the symmetric key; and receive the symmetric key from the key device.

5. The system of claim 1, wherein the processing apparatus is configured to:

responsive to initiation of a takeoff procedure for the unmanned aerial vehicle, delete the symmetric key from memory of the unmanned aerial vehicle.

6. The system of claim 1, wherein the processing apparatus is configured to:

store the symmetric key in volatile memory of the unmanned aerial vehicle; and continue to decrypt, using the symmetric key, portions of the encrypted media data to obtain the decrypted media data and transmit portions of the decrypted media data after the key device has been disconnected from the unmanned aerial vehicle.

7. The system of claim 1, wherein key device includes a light emitting diode and the key device is configured to:

blink the light emitting diode while performing a decryption operation, including decrypting, using the private key, the encrypted symmetric key to obtain the symmetric key; and turn off the light emitting diode responsive to completion of the decryption operation.

8. The system of claim 1, wherein the processing apparatus is configured to:

transmit the portion of the decrypted media data to a controller for the unmanned aerial vehicle.

9. The system of claim 1, wherein the first serial port connector is a universal serial bus plug and the second serial port connector is a universal serial bus receptacle.

10. A method comprising:

during flight of an unmanned aerial vehicle, encrypting, using a symmetric key, media data captured using one or more sensors of the unmanned aerial vehicle to obtain encrypted media data;

encrypting, using a public key stored by the unmanned aerial vehicle, the symmetric key to obtain an encrypted symmetric key, wherein the public key is paired to a private key stored by a key device that is disconnected from the unmanned aerial vehicle during flight;

landing the unmanned aerial vehicle;

connecting the key device to the unmanned aerial vehicle via a first serial port connector of the key device and a second serial port connector of the unmanned aerial vehicle;

while the key device is connected to the unmanned aerial vehicle via the first serial port connector connected to the second serial port connector, decrypting, using the private key, the encrypted symmetric key to obtain the symmetric key;

decrypting, using the symmetric key, a portion of the encrypted media data to obtain decrypted media data; and transmitting a portion of the decrypted media data.

11. The method of claim 10, comprising:

while the key device is connected to the unmanned aerial vehicle via the first serial port connector connected to the second serial port connector, receiving the public key from the key device via the first serial port connector connected to the second serial port connector.

12. The method of claim 10, wherein decrypting, using the private key, the encrypted symmetric key to obtain the symmetric key comprises:

transmitting the encrypted symmetric key to the key device;

invoking decryption of the encrypted symmetric key by a secure element in the key device that stores the private key to obtain the symmetric key; and receiving the symmetric key from the key device.

13. The method of claim 10, comprising:

responsive to initiation of a takeoff procedure for the unmanned aerial vehicle, deleting the symmetric key from memory of the unmanned aerial vehicle.

14. The method of claim 10, comprising:

storing the symmetric key in volatile memory of the unmanned aerial vehicle; and continuing to decrypt, using the symmetric key, portions of the encrypted media data to obtain the decrypted media data and transmit portions of the decrypted media data after the key device has been disconnected from the unmanned aerial vehicle.

15. The method of claim 10, comprising:

blinking a light emitting diode of the key device while performing a decryption operation, including decrypting, using the private key, the encrypted symmetric key to obtain the symmetric key; and turning off the light emitting diode responsive to completion of the decryption operation.

16. The method of claim 10, comprising:
transmitting the portion of the decrypted media data to a controller for the unmanned aerial vehicle.

17. An unmanned aerial vehicle comprising:
one or more sensors,
a first serial port connector configured to connect with a second serial port connector of a key device configured to store a private key, and
a processing apparatus, wherein the processing apparatus is configured to:
 store a public key, wherein the public key is paired to the private key;
 encrypt, using a symmetric key, media data captured using the one or more sensors to obtain encrypted media data;
 encrypt, using the public key, the symmetric key to obtain an encrypted symmetric key;
 delete the symmetric key;
 while the key device is connected to the unmanned aerial vehicle via the first serial port connector connected to the second serial port connector, decrypt, using the private key, the encrypted symmetric key to obtain the symmetric key;
 decrypt, using the symmetric key, a portion of the encrypted media data to obtain decrypted media data; and
 transmit a portion of the decrypted media data.

18. The unmanned aerial vehicle of claim 17, wherein the processing apparatus is configured to:
 receive the public key from the key device via the first serial port connector connected to the second serial port connector.

19. The unmanned aerial vehicle of claim 17, wherein the processing apparatus is configured to:
 responsive to initiation of a takeoff procedure for the unmanned aerial vehicle, delete the symmetric key from memory of the unmanned aerial vehicle.

20. The unmanned aerial vehicle of claim 17, wherein the key device comprises a secure element configured to store the private key, and wherein processing apparatus is configured to:
 transmit the encrypted symmetric key to the key device;
 invoke decryption of the encrypted symmetric key by the secure element using the private key to obtain the symmetric key; and
 receive the symmetric key from the key device.

* * * * *